United States Patent
Cunningham et al.

(10) Patent No.: US 12,531,591 B2
(45) Date of Patent: Jan. 20, 2026

(54) CONFIGURING TRANSCEIVERS WITH TUNING EXCEPTIONS AT NETWORK DEVICES

(71) Applicant: Arista Networks, Inc., Santa Clara, CA (US)

(72) Inventors: Daniel John Cunningham, San Jose, CA (US); Aditya Arvind Bhiday, Sunnyvale, CA (US); Brian Clark Schuette, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 282 days.

(21) Appl. No.: 18/490,620

(22) Filed: Oct. 19, 2023

(65) Prior Publication Data

US 2025/0132780 A1   Apr. 24, 2025

(51) Int. Cl.
*H04B 1/40* (2015.01)
*H04L 41/0866* (2022.01)

(52) U.S. Cl.
CPC ........... *H04B 1/40* (2013.01); *H04L 41/0866* (2013.01)

(58) Field of Classification Search
CPC .............................. H04B 1/40; H04L 41/0866
See application file for complete search history.

(56) References Cited

U.S. PATENT DOCUMENTS

| | | | |
|---|---|---|---|
| 2002/0062472 A1* | 5/2002 | Medlock | H04B 7/06 455/560 |
| 2012/0182430 A1* | 7/2012 | Birkett | H04N 21/4383 348/E5.096 |
| 2014/0244749 A1* | 8/2014 | Martin | H04N 21/25891 709/204 |

* cited by examiner

*Primary Examiner* — Zhiren Qin
(74) *Attorney, Agent, or Firm* — Sprinkle IP Law Group (57) ABSTRACT

Systems and methods for simply and efficiently configuring transceiver modules are disclosed. These systems and methods may allow the configuration of transceiver modules using values for tuning parameters that are different from standard values for those tuning parameters based on attributes of either a transceiver module or a network device with which that transceiver module is being utilized.

20 Claims, 4 Drawing Sheets

CONFIGURING TRANSCEIVERS WITH TUNING EXCEPTIONS AT NETWORK DEVICES

BACKGROUND

Network devices utilize transceivers to send and receive data across networks. In many cases, these network devices may utilize multiple transceivers, where those transceivers are independent modules that may be plugged into slots of the network device. The advantage of using these types of modular transceivers is that individual slots of network devices can be equipped with different types of transceivers as required. These modular transceivers may have programmable tuning parameters so the performance of the modular transceiver can be adjusted as desired (e.g., based on its intended use or device with which it is being utilized). In some cases there may be standard values for configuring such tuning parameters. These standard values may include module default tuning parameters that are standard on the transceiver module and which may be used by the module on power up or reset, or default tuning parameters that may be stored at the network device and used at the network device to configure tuning on the transceiver module.

There are, additionally, a number of instances where it is desirable to implement tuning exceptions when selecting tuning parameters for transceiver modules at a network device. The configuration of transceiver modules may, however, require a great deal of knowledge or expertise. Typical users of network devices may lack such knowledge and expertise, making the proper configuration of transceiver modules highly difficult for these users. Moreover, even in cases where tuning exceptions are defined for a transceiver module in a particular slot at a network device, the individual tuning parameters specified for a transceiver module may not be portable across different transceiver modules or slots of the network device.

What is desired, then, are simple and straightforward systems and methods for configuring tuning parameters for transceiver modules on network devices.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

As discussed, Network devices (e.g., switches, routers, servers, network interface cards, head end systems, etc.) utilize transceivers to send and receive data across a network. In many cases, these network devices may utilize multiple transceivers, where those transceivers are independent modules that may be plugged into (e.g., inserted into) slots (e.g., connection points) of the network device. These transceiver modules may be governed by a number of specifications or standards.

For example, Small Form-factor Pluggable (SFP) is a compact, hot-pluggable network interface module format used for both telecommunication and data communications applications. An SFP interface on a network device is thus a modular slot for a media-specific transceiver, such as for fiber-opticor copper cabling. A slightly larger format related to SFP is the four-lane Quad Small Form-factor Pluggable (QSFP). The additional lanes of the QSFP allow for speeds typically four times a corresponding SFP. In 2014, the QSFP28 variant was published allowing speeds up to 100 Gbit/s. In 2019, the closely related QSFP56 was standardized, doubling the top speeds to 200 Gbit/s. As another example, Octal Small Form-factor Pluggable (OSFP) format may comprise eight lanes running at 50 Gb/s each, for a total of the bandwidth of 400 Gb/s. Other formats (e.g., QSFP-DD, SFP56, SFP28, etc.) have also been defined and are fully contemplated herein along with other formats that may be developed in the future.

The advantage of using these types of modular transceivers (e.g., compared to fixed interfaces) is that individual slots of network devices can be equipped with different types of transceivers as required. Moreover, these transceiver modules are hot-pluggable (e.g., may be removed or added to, and utilized by, a running network device without significant interruption of the operation of that network device). These qualities allow repairs, improvements, or other adjustments to be made to existing networks or network devices in a simple manner (e.g., without having to redesign or reconfigure entire networks, network devices, or cabling infrastructure).

Accordingly, almost all network devices currently accept some form of modular pluggable transceivers. The flexibility offered by such a modular transceiver architecture does not, however, come without some attendant problems. Many of these problems stem from the configurable nature of modular network transceivers, whose standardized form factor also provides the advantage of allowing these modular transceivers to be utilized across multiple types of network devices and slots in those devices. To illustrate in more detail, in part because of the varied usage of these modular transceivers, they may have programmable tuning parameters so the performance of the modular transceiver can be adjusted (e.g., based on the type of use of that transceiver). These tuning parameters can, for example, control the Rx (ingress) and Tx (egress) performance of the serializer/deserializer (SerDes) of the transceiver and can impact the transceiver's ability to send and receive error free traffic. Such tuning parameters can include, for example, tx-input-equalization, rx-output-preemphasis, tx-input-adaptive-enable, rx-output-post-emphasis, rx-output-amplitude.

In some cases there may be standard values for configuring tuning parameters, such as module default tuning parameters that are standard on the transceiver module and may be used by the module on power up or reset, or default tuning parameters that may be stored at the network device and used by the network device to configure a transceiver module. The selection of the tuning parameters to utilize for a modular transceiver in a given context is not, however, a straightforward process. While there may be standard values for configuring such tuning parameters, and network devices may be adapted to configure such tuning parameters according to a particular algorithm, because of the variety and number of extant transceiver modules, network devices, slot formats, etc. it may be difficult to implement an effective method for the selection of values of tuning parameters for those transceiver modules. Moreover, there may be a number of instances where it is desirable to implement exceptions to (e.g., different values from) these standard selected tuning values. These tuning exceptions may arise for a number of reasons.

To elaborate on these reasons, while a manufacturer of a network device may manufacture their own transceivers, they may also provide third-party transceivers that may be sourced from one or multiple suppliers and given the manufacturer's imprimatur. In such cases, the manufacturer of the transceiver may vary what is ostensibly the same model or type of transceiver without notifying the manufacturer of the network device (e.g., by changing software or hardware on the transceiver module). Thus, the same model of transceiver module may function slightly differently based on the time of manufacture of the transceiver module itself.

Additionally, users of network devices may source such transceiver modules independently of the manufacturer of the network device (e.g., from different suppliers). These transceiver modules may not function, or be configured, the same as that model or type of transceiver module as provided from the manufacturer of the network device. Here, then, the same model of transceiver module may function slightly differently based on the variations of transceiver modules from different sources, or based on the versions received from different suppliers.

The function of the same transceiver module (e.g., model or the same transceiver module itself) may also vary based on a number of factors associated with the network device with which it is utilized, or how it is utilized with the network device, such as the type or model of the network device, the slot type or number into which the transceiver module is plugged, the operating system version of the network device, or other factors.

Accordingly, there may be a number of instances where it is desirable to implement tuning exceptions when selecting tuning parameters for a transceiver module at a network device (e.g., to select values for tuning parameters different from a standard set of tuning values that may be selected for the transceiver). Moreover, as may be realized, there may be an extremely large number of permutations of attributes (or attribute values) which may drive the values for the tuning parameters in these tuning exceptions. In other words, the values for tuning parameters that it is desired to utilize with respect to a particular transceiver module at a particular network device may vary based on a number of variables, including hardware or software attributes of the transceiver module being utilized or attributes of the network device with which that transceiver module is being utilized. These attributes may pertain, for example to the manufacturer of the transceiver module, the model of that transceiver module, the type of network device (e.g., model) with which that transceiver module is being utilized, the type of slot in which the transceiver module is being utilized or other aspects of the transceiver or network device.

While attempts have been made at allowing users to customize the tuning of transceiver modules at network devices, these solutions have heretofore proved quite problematic. In certain instances, for example, a network device may offer a user the ability to specify individual tuning parameters for a transceiver module in a slot at the network device (e.g., using a command line interface (CLI), an Application Programming interface (API), or the like). The individually specified tuning parameter values for that transceiver module can then be applied to that transceiver module by the network device. Such a solution is less than adequate. First, configuration of transceiver modules may require a great deal of knowledge or expertise; knowledge and expertise that typical users of network devices may lack, making the proper configuration of transceiver modules highly difficult for such users. Moreover, the individual tuning parameters specified for a transceiver module may not be portable. Namely, these individually specified tuning parameters may be slot specific and thus may not apply to that same transceiver module should that transceiver module be plugged into a different slot of the network device, or may incorrectly be applied to configure another type of transceiver module plugged into the same slot.

What is desired, then, are simple and straightforward systems and methods for configuring tuning parameters for transceiver modules on network devices. In particular, what is desired are simple and effective mechanisms for implementing tuning exceptions for transceiver modules based on attributes of transceiver modules or network devices.

To those ends, among others, attention is now directed to embodiments of systems and methods for transceiver tuning at network devices. In particular, embodiments of such systems and methods may provide simple and efficient mechanisms for configuring transceiver modules using values for tuning parameters that are different than standard values for those tuning parameters (i.e., tuning exceptions) based on attributes of either the transceiver module or the network device with which that transceiver module is being utilized. Even more specifically, embodiments may allow the specification of tuning exceptions (e.g., values for one or more tuning parameters) associated with attribute values for attributes of either a transceiver module or a network device.

In particular, embodiments may allow the definition of tuning exceptions in a tuning exception file (or via other mechanisms such as a command line or application programming interface, etc.) that includes a mapping of attribute values for a combination of (e.g., one or more) attributes associated with a transceiver module or network device to a tuning exception comprising values for one or more tuning parameters. These transceiver attributes may include, for example, vendor or manufacturer name, vendor or manufacturer part number, serial number or revision, or almost any other attribute values that may be stored on the transceiver or otherwise obtained about the transceiver module, while the network device attributes may include attributes such as system model (e.g., SKU or other identifier for the network device), slot type, slot number, operating system type or version, or other attributes associated with a network device. The tuning parameters for which values are specified in the tuning exception can include, for example, the tuning parameters mentioned above such as one or more of tx-input-equalization, rx-output-preemphasis, tx-input-adaptive-enable, rx-output-post-emphasis or rx-output-amplitude.

This combination of attributes and associated values (referred to as the key herein) and the associated set of values for the tuning parameters comprising the tuning exception (referred to as the tuning exception value) may, for example, be specified in a comma separated values file, a Yet Another Markup Language or YAML Ain't a Markup Language (YAML) file, a JavaScript Object Notation (JSON) file, or almost any other file or data format that may be used for encoding data (collectively referred to herein as tuning exception file without loss of generality). Accordingly, a tuning exception file may be loaded or otherwise stored on a network device (e.g., may be provided over the network and stored on the network device, provided in an operating system installed on the network device, included in an update of the software of the network device, or otherwise provided). In this way, a tuning exception may be provided by a manufacturer of the network device in software (e.g., an operating system) installed, or updated on the network device.

When the network device detects a transceiver module is plugged into a slot of the network device any transceiver module attribute values may be obtained (e.g., read) from the transceiver module in the slot. Desired network device attribute values for attributes of the network device may also be obtained (e.g., from an operating system or storage location on the network device). The attribute values for the transceiver module and the network device can be combined to form a tuning exception search key and this tuning exception search key used to perform a search (e.g., match against) against the keys included in the tuning exception file. It will be noted that there may be more or fewer transceiver module attribute values or network device attribute values used to form the tuning exception search key than have been used to define the keys for tuning exceptions in the tuning exception value file. Accordingly a matching algorithm may be utilized that allows for a partial or pattern match between the formed tuning exception search key such as a regular expression (e.g., a regex match) or the like. If a matching key is found in the keys as included in the tuning exception file the tuning exception (i.e., the associated set of values for tuning parameters) corresponding to that matching key may be obtained and used to configure the transceiver module in the slot. If, however, there are no matching keys, other values for tuning parameters may be used to configure the transceiver module such as default tuning (values) specified on the network device (e.g., associated with the transceiver module) or module default tuning (values) as specified in the transceiver module itself.

If there are multiple matches to the formed key found when matching a tuning exception, selection may be made according to a selection process, such as taking the first match, the last match, the match with the most number of attribute values specified, the match with the most tuning parameters specified in the tuning exception, or some other method of selecting a matching tuning exception value.

In one embodiment, for example, the network device may have a process (e.g., referred to as an agent or controller) that is responsible for one or more slots of the device and monitors the slot for the presence of a transceiver module. In some cases, the agent, or a component thereof, may be responsible for a single slot of the network device. The agent can thus detect the presence of a transceiver module in a slot at bootup or initialization of the network device, when a transceiver module has been plugged into the slot during operation of the network device, or otherwise. When a transceiver module is detected, the responsible agent can obtain the attribute values from that transceiver module and the network device, form the tuning exception search key from the attribute values, perform the match of the keys, obtain any tuning exception corresponding to any matching key found, and configure the transceiver module appropriately.

As such, if the transceiver module is moved to another slot, the agent responsible for that other slot may detect the transceiver module in that second slot and obtain the attribute values from that transceiver module and the network device (e.g. which may be associated with the second slot), form a tuning exception search key from those attribute values, perform a match of the keys, obtain any tuning exception corresponding to any matching key found, and configure the transceiver module appropriately in the second slot. As can be seen, then, the use of embodiments as disclosed may allow the same, or a different, or no, tuning exception to be applied to a transceiver module in two different slots (e.g., which may be different types of slots).

Additionally, when the network device is booted or otherwise initialized (or re-initialized), the tuning exception file at the network device may be read and a data structure, (generically referred to herein as a table) that includes the keys (e.g., attributes and values) and corresponding tuning exception values specified in the tuning exception file, may be created in storage at the network device (e.g., in a system database or the like). The agent configuring the transceiver module can thus perform the key matching using this stored tuning exception table.

Embodiments as disclosed may also be used seamlessly with user-provided customized configuration for tuning exceptions for one or more slots or otherwise for a transceiver module. For example, in one embodiment a user of a network device may specify (e.g., via a CLI command or the like) an alternative tuning exception file to be utilized (e.g., instead of a tuning exception file provided with the operating system of the network device). If such an alternative tuning exception file is specified, the keys and tuning exception of the alternative tuning exception file may be utilized in place of, or addition to, any keys and tuning exceptions specified in the provided tuning exception file on the network device. Such a capability may allow rapid field customization to address problems not detected before shipment of a network device or operating system, or problems with third party transceiver modules. Additionally, a user may specify (e.g., via a CLI command or the like), values for tuning parameters for an individual slot or transceiver module (referred to as tuning override values). If such configured override tuning is detected for the slot or transceiver module (e.g., and is applicable to the detected transceiver module), these user provided values for the tuning parameters may be determined (e.g., by the agent responsible for the slot) and used to configure the transceiver module in the slot without regard to the tuning exceptions of the tuning exception file or any default tuning parameters.

Embodiments as disclosed may thus provide a number of advantages. Importantly, embodiments may allow tuning exceptions to be applied to transceiver modules at a network device on a highly individualized and granular basis in a manner which reduces, or even removes, user involvement in the application of such tuning exceptions. Moreover, embodiments may allow a transceiver module to be moved from one slot to another slot at a network device and a tuning exception applicable to that transceiver module automatically applied. The applied tuning exception may be the same or a different tuning exception than was applied to that same transceiver module when used in the first slot and may be based on the slot type or slot number of the second slot in which the transceiver module is used. Alternatively, standard or default values for tuning parameters, or another tuning exception, may be applied to that same transceiver module when it is moved to the second slot (e.g., based on the type of the second slot). And once again, these tuning exceptions (e.g., or default tuning parameters) may be applied without involvement of the user of the network device.

Figure 1A:
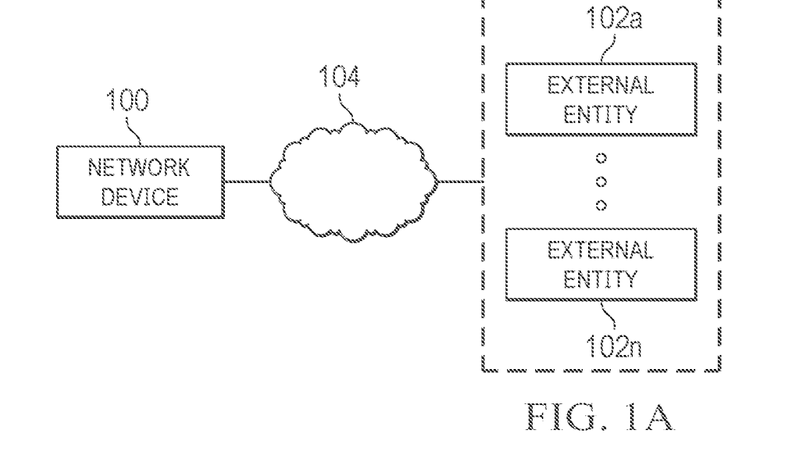
FIG. 1A is a block diagram of a network system including an embodiment of a network device for configuring transceiver modules using tuning exceptions.

Looking now at FIG. 1A, a computing system including one embodiment of a network device adapted for configuring transceiver modules according to tuning exceptions is depicted. The system includes a network device 100 connected to one or more external entities (e.g., 102A, 102N). The network device 100 and the external entities 102 may be directly or indirectly connected to each other using any combination of wired or wireless connections and may communicate using one or more wireless or wired protocols. In embodiments there may be other network devices (or systems) (not shown) that facilitate communication between the devices.

Network device 100 may include persistent storage, memory (e.g., Random Access Memory), one or more processors, transceiver modules and ports. Each transceiver module may or may not be connected to another device on a network (e.g., a server, a switch, a router, etc.). Network device 100 includes hardware or software for determining how to route packets at the network device 100 (e.g., to which egress port a packet should be routed). Network device 100 may thus be adapted to receive packets via its transceiver modules and process the packets to determine whether to drop or route the packets, and where the packet should be routed.

Network device 100 configures these transceiver modules according to a set of tuning parameters. In particular, network device 100 may have a set of standard tuning parameters that may be used to configure transceiver modules at network device 100. These standard tuning parameters may be, for example, module default tuning parameters that are standard on the transceiver module and may be used by the transceiver module on power up or reset, or default tuning parameters that may be stored at network device 100 and used by network device 100 in configuring the transceiver modules.

Network device 100 may also provide mechanisms for configuring transceiver modules using values for tuning parameters that are different from the standard values for those tuning parameters based on attributes of either the transceiver module or network device 100. These tuning exceptions (e.g., values for one or more tuning parameters) can be specified in association with attribute values for attributes of either a transceiver module or network device 100. Accordingly, to configure a transceiver module, network device 100 may obtain corresponding attribute values associated with that transceiver module and network device 100 and use these attribute values to identify any applicable tuning exceptions for that transceiver module as used at network device 100. If an applicable tuning exception is found the associated set of values for tuning parameters of that tuning exception may be obtained by network device 100 and used to configure the transceiver module. If no applicable tuning exceptions are found for the transceiver module, other values for tuning parameters may be used by network device 100 to configure the transceiver module, such as default tuning specified on the network device or module default tuning as specified in the transceiver module itself.

External entity 102 may be, or may execute on, any type of computing system that is configured to interact with the network device 100. For example, the external device 102 may be a desktop computer operated by a network administrator or other type of user. Users at these external network devices 102 may also provide tuning configuration data for configuration of transceiver modules at network device 100. Embodiments as disclosed may also be used seamlessly with such user provided customized configuration for tuning exceptions. For example, network device 100 may be adapted to utilize an alternative tuning exception file specified by a user at external entity 102 (e.g., via a CLI command or the like offered by network device 100). If an alternative tuning exception file is specified the tuning exceptions of the alternative tuning exception file may be utilized by network device 100 to configure transceiver modules in place of, or addition to, any tuning exceptions specified in a provided tuning exception file (or any default tuning parameters) on network device 100. Additionally, network device 100 may utilize values for tuning parameters specified by a user at external entity 102 for individual slots or transceiver modules at network device 100. If such individual tuning parameters are detected for the slot or transceiver module (e.g., and are applicable to the detected transceiver module), network device 100 is adapted to use such individual tuning parameters to configure a transceiver module at network device 100 without regard to any tuning exceptions of a tuning exception file or any default tuning parameters.

Figure 1B:
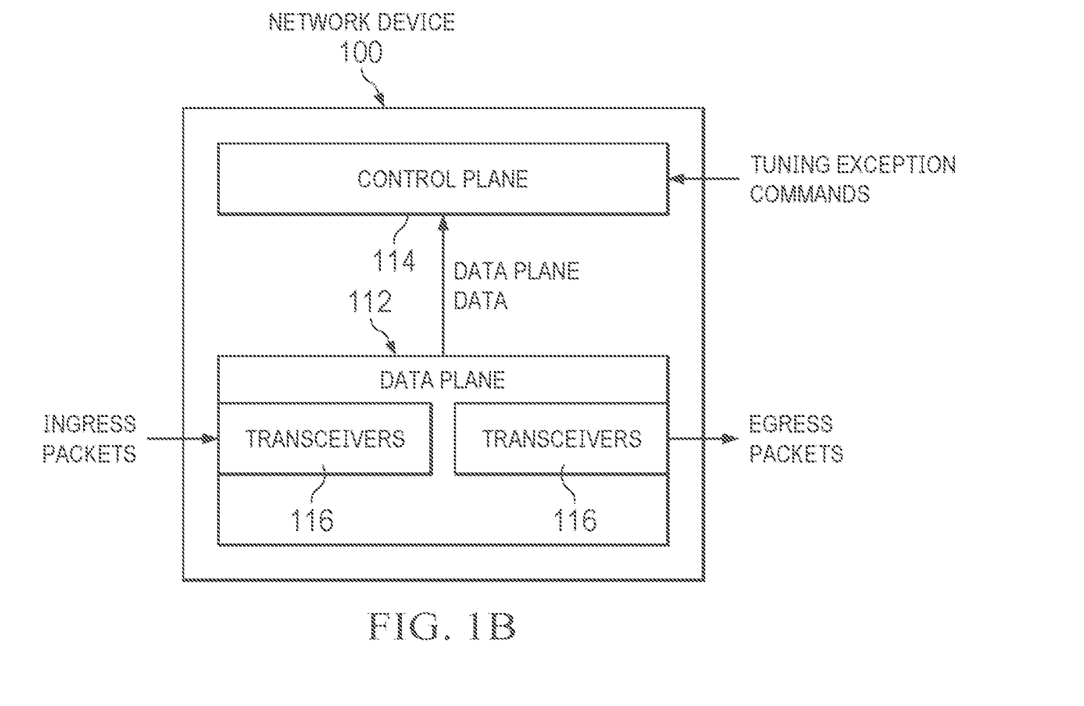
FIG. 1B is a block diagram of an embodiment of a network device for configuring transceiver modules using tuning exceptions.

Moving to FIG. 1B, an embodiment of a network device adapted for configuring transceiver modules according to tuning exceptions is depicted in more detail. Network device 100 includes a data plane 112 and a control plane 114. The data plane 112 is adapted to receive packets (ingress packets) via transceiver modules 116 of the network device 100, process the packets and, as appropriate, route packets (egress packets) via the transceiver modules 116. The data plane 112 is also adapted to gather data plane information and to provide this data plane information to the control plane 114. Data plane information includes, for example, network usage data, flow information based on the sampling of packets received by the data plane, information related to queue depths on ingress or egress buffers (not shown) in the data plane, other data traffic statistics or other types of data plane information.

Control plane 114 is adapted to manage the operation of network device 100 (e.g., at least partially based on the data plane information received from data plane 112). More specifically, control plane 114 is adapted to manage the operation of data plane 112. Control plane 114 may thus be adapted to configure transceiver modules 116 using values for tuning parameters that are different from the standard values for those tuning parameters based on attributes of either the transceiver module or network device 100.

According to one embodiment, then, network device 100 comprises a definition of tuning exceptions specified in a tuning exception file stored on network device 100, where the tuning exception file includes a mapping of attribute values for a combination of attributes associated with transceiver modules or network devices to a tuning exception comprising values for one or more tuning parameters. To facilitate this configuration, control plane 114 may also provide an interface such as a CLI or API (e.g., through an operating system) through which an alternative tuning exception file or individual tuning exception parameters may be provided or specified.

Control plane 114 may also include a tuning exception process responsible for configuring transceiver modules 116 of data plane 112. This tuning exception process can detect the presence of a transceiver module 116 in a slot of network device 100. When a transceiver module 116 is detected the tuning exception process can obtain attribute values associated with that transceiver module 116 or network device 100 and obtain any tuning exception corresponding to those attribute values, such as an applicable tuning exception specified in a tuning exception file, an alternative tuning exception file provided by a user, or an individual tuning exceptions provided by a user. The tuning exception process can then configure that transceiver module 116 appropriately according to the values for the tuning parameters associated with any tuning exceptions found or, if no tuning exceptions were found, using default tuning parameters specified at network device 100 or on transceiver module 116.

Figure 2:
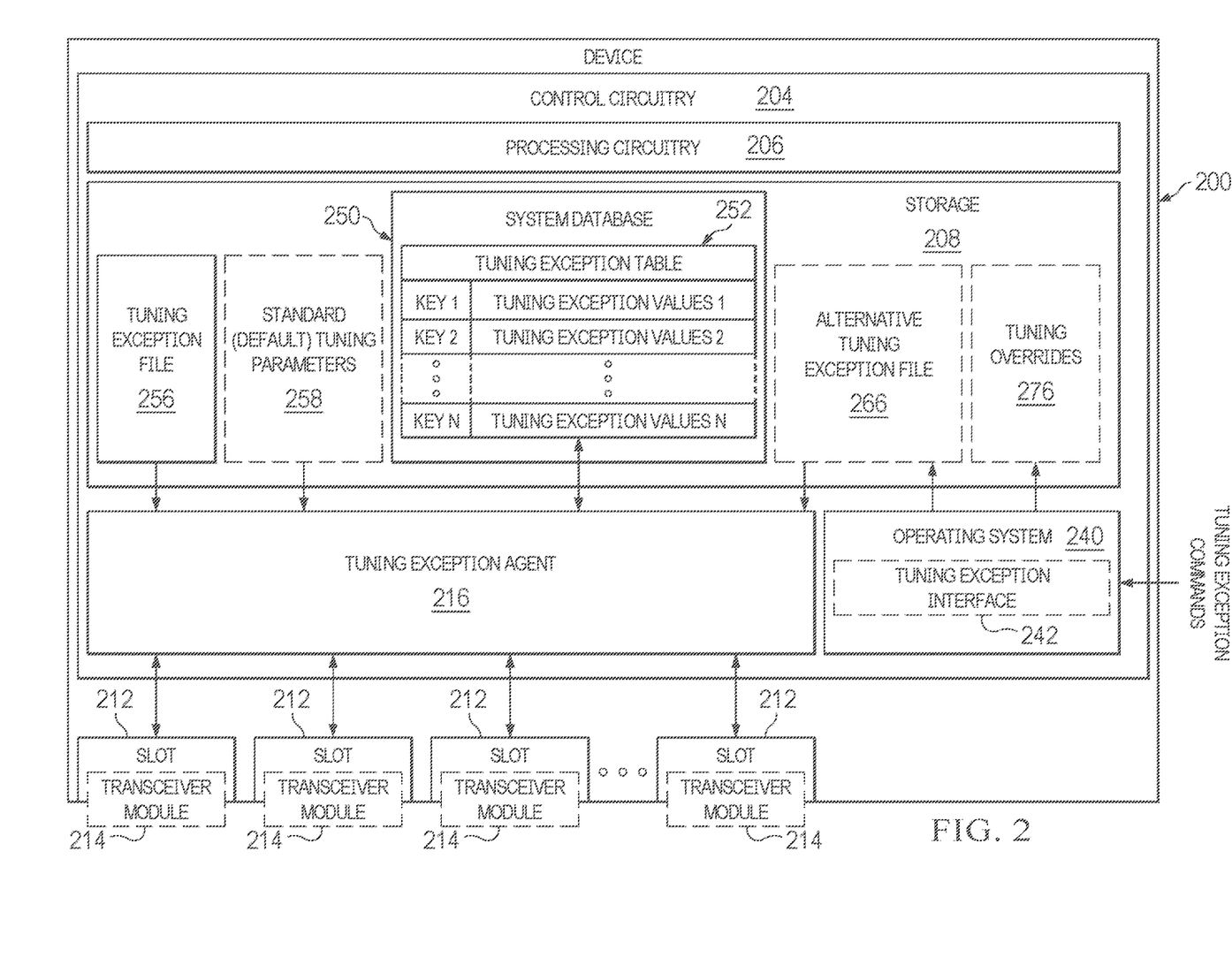
FIG. 2 is a detailed block diagram of an embodiment of a network device adapted for configuring transceiver modules using tuning exceptions.

Referring now to FIG. 2, a block diagram depicting a more detailed architecture of an embodiment of a network device adapted for configuring transceiver modules according to tuning exceptions is presented. Network device 200 may be a router, switch, server, network interface cards, head end system, or any other computing device that may be configured to control or process network traffic. Network device 200 may include one or more physical slots (connection points) 212 into which transceiver modules 214 may be inserted. These transceiver modules 214 are thus independent modules that may be plugged into (e.g., inserted into) slots 212 of network device 200. These slots 212 and transceiver modules 214 may conform, at least in part, to one or more specifications or standards such as SFP, QSFP, QSFP28, QSFP56, OSFP, QSFP-DD, SFP56, SFP28, SFF-8472, SFF-8636, CMIS, etc. Moreover, different slots 212 of network device 200, and transceiver modules 214 used with those slots 212, may conform to different ones of these standards or specifications. It will be noted that such standards and formats are given by way of example and that other, different, standards whether currently extant or developed in the future are contemplated herein.

Data, including packets, may be received from other devices on a network or other sources, via transceiver modules 214 in slots 212. Slots 212 are connected to control circuitry 204. Packet data on packets received at transceiver modules 214 may thus be provided to control circuitry 204. Control circuitry 204 may send and receive commands, requests, and other suitable data in order to route, or otherwise process, these received packets.

Control circuitry 204 includes processing circuitry 206 and storage (i.e., memory) 208. As referred to herein, processing circuitry should be understood to mean software or circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry 206 is distributed across multiple separate processors or processing units, for example, multiple of the same type of processing units or multiple different processors. The circuitry described herein may execute instructions included in software running on one or more general purpose or specialized processors.

Storage 208 may be an electronic storage device that includes volatile random-access memory (RAM), which does not retain its contents when power is turned off, and non-volatile RAM, which does retain its contents when power is turned off. As referred to herein, the phrase "electronic storage device" or "storage device" should be understood to mean any device for storing electronic data, computer software, instructions, or firmware, such as RAM, content-addressable memory (CAM) (including a TCAM), hard drives, optical drives, solid state devices, quantum storage devices, or any other suitable fixed or removable storage devices, or any combination of the same.

Network device 200 is adapted for configuring transceiver modules 214 using values for tuning parameters that are different from standard values for those tuning parameters (i.e., tuning exceptions) based on attributes of either transceiver module 214 or network device 200. In particular, control circuitry 204 may execute instructions for tuning exception agent 216 that is responsible for slots 212, and monitors slots 212 for the presence of transceiver modules 214. In some cases, there may be components of tuning exception agent 216 that are each responsible for a single slot 212 of network device 200. The tuning exception agent 216 can thus detect the presence of transceiver modules 214 in slots 212 at bootup or initialization of the network device, or during operation of network device 200 (e.g., when transceiver modules 214 are hot swapped), and may configure detected transceiver modules 214 where that configuration may account for any tuning exceptions applicable to that detected transceiver module 214.

To illustrate in more detail, tuning exception file 256 may be stored in storage 208 at network device 200. This tuning exception file 256 may include a mapping of attribute values for a combination of (e.g., one or more) attributes associated with a transceiver module or network device to a tuning exception comprising values for one or more tuning parameters. These transceiver attributes may include, for example, vendor name, vendor part number, serial number or revision, or almost any other attribute values that may be stored on a transceiver module, while the network device attributes may include attributes such as system model (e.g., SKU or other identifier), slot type, slot number (identifier), operating system type or version, or other attributes associated with a network device. The tuning parameters for which values are specified in the tuning exception can include, for example, tuning parameters such as tx-input-equalization, rx-output-preemphasis, tx-input-adaptive-enable, rx-output-post-emphasis or rx-output-amplitude.

This combination of attributes and associated values (referred to as the key herein) and the associated set of values for the tuning parameters comprising the tuning exception (referred to as the tuning exception value) may, for example, be specified in a comma separated values file, a Yet Another Markup Language or YAML Ain't a Markup Language (YAML) file, a JavaScript Object Notation (JSON) file, or almost any other file or data format that may be used for encoding data (collectively referred to herein as tuning exception file without loss of generality). Accordingly, tuning exception file 256 may be loaded or otherwise stored on network device 200. For example, tuning exception file 256 may be provided over a network and stored on network device 200, tuning exception file 256 may be provided in association with operating system 240 installed on network device 200, or tuning exception file 256 may be included in an update of the software of network device 200. In this way, tuning exceptions may be provided by a manufacturer (or third party) of network device 200 in software (e.g., operating system 240) installed, or updated on network device 200. An example schema for a tuning exception file along with one example of a YAML tuning exception file is provided in the Appendix. In this example, each entry is denoted by "name", the key for that entry is denoted by the "matchingCriteria" and the tuning exception comprising values for tuning parameters is denoted by the "tuningParameters" for that entry.

Embodiments as disclosed may also be used with user provided customized configuration for tuning exceptions for one or more slots 212 or otherwise for (e.g., a particular type of) transceiver module 214. In these embodiments, operating system 240 may provide tuning exception interface 242 such as a CLI or API through which an alternative tuning exception file or individual tuning exception parameters (tuning overrides) may be provided or specified (e.g., using tuning exception commands). Any specified alternative tuning exception file 266 or tuning overrides 276 may be stored in storage 208.

Accordingly, when network device 200 is booted or otherwise initialized (or re-initialized), tuning exception agent 216 may determine if there is an alternative tuning exception file 266 in storage 208. If there is no alternative tuning exception file 266 tuning exception agent 216 may read tuning exception file 256 and create tuning exception table 252 in system database 250. System database 250 may include any single or combination of shared or non-shared data stores (e.g., memories) at one or more locations that store the current state of network device 200 such that the system database 250 includes network element data specifying the values of variables or parameters that are currently specified or configured for network device 200. Thus, tuning exception table 252 may comprise entries, where each entry in tuning exception table 252 includes a key (e.g., transceiver module or network device attributes and associated values) and corresponding tuning exception values (e.g., values for one or more tuning parameters). If, however, there is an alternative tuning exception file 266, tuning exception agent 216 may read this alternative tuning exception file 266 (e.g., instead of tuning exception file 256) and create tuning exception table 252 in system database 250 based on this alternative tuning exception file 266 such that entries in tuning exception table 252 reflect the keys and tuning exceptions specified in the alternative tuning exception file 266.

Tuning exception agent 216 is also adapted to detect the presence of a transceiver module 214 in a slot 212 at bootup or initialization of network device 200, when a transceiver module 214 has been plugged into a slot 212 during operation of the network device 200, or otherwise. In one embodiment, when tuning exception agent 216 detects a transceiver module 214 in a slot 212, tuning exception agent 216 can determine if there are any tuning overrides 276 that apply to the detected transceiver module 214 or slot 212 into which that transceiver module 214 was inserted. If such configured tuning overrides 276 are detected for that slot 212 or transceiver module 214 (e.g., and are applicable to the detected transceiver module), tuning exception agent 216 may use these user provided tuning override values for tuning parameters to configure the transceiver module 214 in the slot 212 (e.g., without regard to the tuning exceptions of the tuning exception file 256 or any default tuning parameters 258 for those tuning parameters specified for that transceiver module 214 or slot 212 in tuning overrides 276).

If no applicable tuning overrides 276 are determined when a transceiver module 214 is detected, tuning exception agent 216 can obtain transceiver module attribute values from the detected transceiver module 214 in that slot 212. Such values may, for example, be read off the transceiver module 214. Desired network device attribute values for attributes of network device 200 may also be obtained (e.g., from operating system 240, system database 250 or another storage location on network device 200). The attribute values for the detected transceiver module 214 and network device 200 are combined to form a tuning exception search key by tuning exception agent 216. The formed tuning exception search key is used by tuning exception agent 216 to perform a search (e.g., match against) the keys of entries included in tuning exception table 252. It will be noted that there may be more or fewer transceiver module attribute values or network device attribute values used to form the tuning exception search key than have been used to define the keys for entries in tuning exception table 252. Accordingly a matching algorithm such as a regex match or the like may be utilized by tuning exception agent 216 to allow for a partial or pattern match between the formed tuning exception search key and the keys of tuning exception table 252.

If the search performed by tuning exception agent 216 matches a key in tuning exception table 252, the tuning exception (e.g., values for one or more tuning parameters) corresponding to that matching key may be obtained by tuning exception agent 216 from tuning exception table 252. If there are multiple matches to the formed tuning exception search key found when matching keys in tuning exception table 252, tuning exception agent 216 may select a single corresponding matching key from tuning exception table 252 according to a selection process, such as taking the first match, the last match, the match with the most number of attribute values specified, the match with the most tuning parameters specified in the corresponding tuning exception, or some other method. When a matching key is found, tuning exception agent 216 can then use the values for the tuning parameters of that tuning exception corresponding to that matching key to configure the detected transceiver module 214 in slot 212. If, however, there are no matching keys when a search of tuning exception table 252 is performed, other values for tuning parameters may be used to configure the detected transceiver module 214, such as default tuning parameters 258 specified on network device 210 (e.g., determined by tuning exception agent 216 to be associated with the detected transceiver module 214), or module default tuning as specified in the transceiver module 214 itself.

As can be seen, the use of tuning exception agent 216 may allow tuning exceptions to be applied (or not applied) at a granular level based on individual permutations of a wide variety of attributes, including those pertaining to a transceiver module, slot, or network device among others. For example, if that same transceiver module 214 is moved to another slot 212 at network device 200, tuning exception agent 216 may detect that transceiver module 214 in that second slot 212 and once again obtain the attribute values from that transceiver module 214 and network device 200 (e.g. which may be associated with the second slot, such as the slot number or type), form a tuning exception search key from those attribute values, perform a match of the keys in tuning exception table 252, obtain any tuning exception corresponding to any matching key found, and configure the transceiver module 214 appropriately in the second slot 212. Accordingly, the same, a different, or no tuning exception may be applied to that same transceiver module 214 in two different slots 212 (e.g., which may be different types of slots).

Similarly, if a different transceiver module 214 is plugged into that same slot 212 at network device 200, tuning exception agent 216 may detect this new transceiver module 214 in that same slot 212 and obtain the attribute values from that new transceiver module 214 and network device 200, form a tuning exception search key from those attribute values, perform a match of the keys in tuning exception table 252, obtain any tuning exception corresponding to any matching key found, and configure the new transceiver module 214 appropriately in that same slot 212. Accordingly, the same, a different, or no tuning exception may be applied to different transceiver modules 214 in the same slot 212.

Figure 3A:
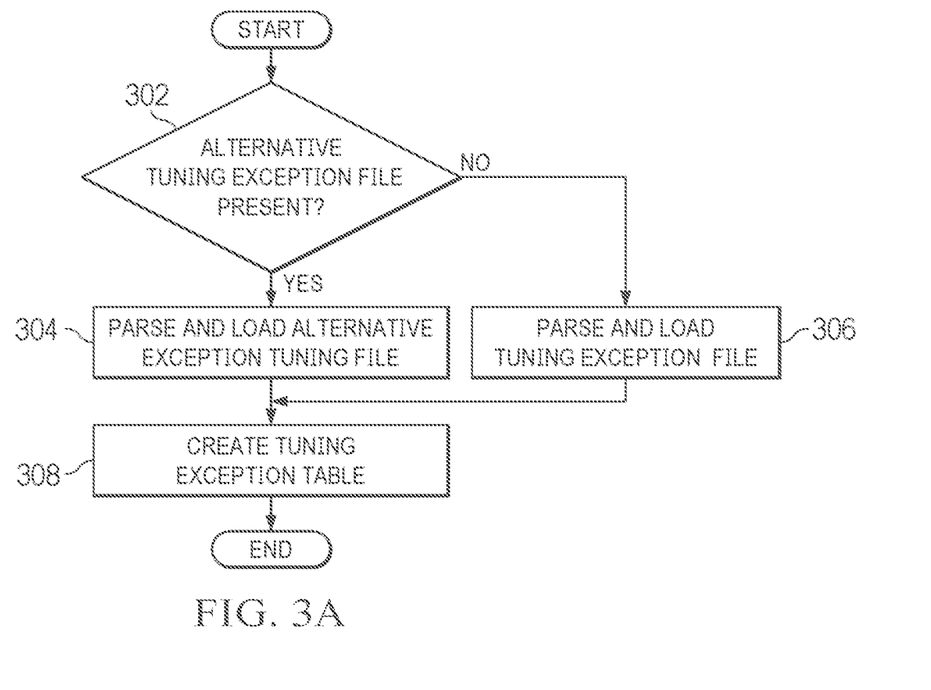
FIG. 3A is a flow diagram of a method for creating a tuning exception table.
Figure 3B:
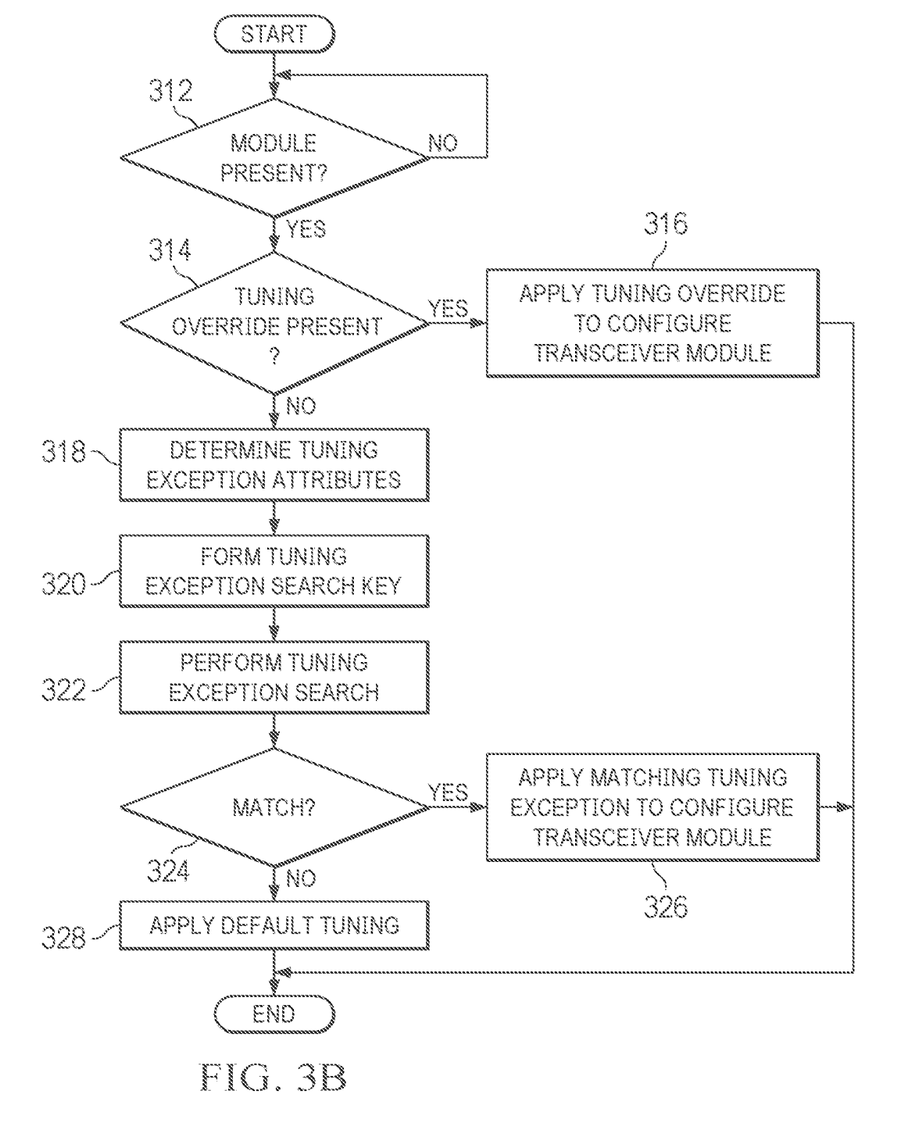
FIG. 3B is a flow diagram of a method for configuring a transceiver module using a tuning exception.

FIG. 3A depicts an embodiment of a method for generating a tuning exception table at a network device while FIG. 3B depicts an embodiment of a method for applying those tuning exceptions to a transceiver module at a network device. Referring first to FIG. 3A when a network device is booted or otherwise initialized (or re-initialized), it can be determined if there is an alternative tuning exception file at the network device (STEP 302). If there is no alternative tuning exception file (N branch of STEP 302), a tuning exception file can be loaded and parsed to determine a set of keys and corresponding tuning exceptions (STEP 306), wherein the keys comprise values for attributes associated with the transceiver module or network device attributes and the tuning exceptions comprise values for one or more tuning parameters for a transceiver module. A tuning exception table can then be created at the network device where that tuning exception table may comprise entries including the keys and corresponding tuning exceptions as determined from the tuning exception file (STEP 308). If there is an alternative tuning exception file at the network device (Y branch of STEP 302), this alternative tuning exception file can be loaded and parsed to determine the set of keys and corresponding tuning exceptions (STEP 304). A tuning exception table can then be created at the network device where that tuning exception table may comprise entries including the keys and corresponding tuning exceptions as determined from the alternative tuning exception file (STEP 308).

Moving on to FIG. 3B, slots in a network device may be monitored to detect the presence of a transceiver module such as at bootup or initialization of the network device or when a transceiver module has been plugged into a slot during operation of the network device or in other circumstances (STEP 312). When a transceiver module is detected in a slot (Y branch of STEP 312) it can be determined if there are any (e.g., user specified) tuning overrides that apply to the detected transceiver module or slot into which that transceiver module was inserted (STEP 314). If such configured tuning overrides are detected for that slot or transceiver module (Y branch of STEP 314) these tuning override values for the tuning parameters may be used to configure the transceiver module in the slot (STEP 316).

If no applicable tuning overrides are determined when a transceiver module is detected (N branch of STEP 314), tuning exception attribute values can be determined (STEP 318). These tuning exception attribute values may include values for transceiver attributes such as a vendor or manufacturer name, vendor or manufacturer part number, serial number or revision, or almost any other attribute values that may be stored on the transceiver or otherwise obtained about the transceiver module. The values for transceiver attributes can, for example, be read from the detected transceiver module. The tuning exception attribute values may also include values for network device attributes such as a system model (e.g., SKU or other identifier for the network device), slot type or slot number of slot where the transceiver module was detected, an operating system type or version, or other attributes associated with the network device.

These tuning exception attribute values for the detected transceiver module or network device are then used to form a tuning exception search key (STEP 320). The formed tuning exception search key is used to perform a search (e.g., match against) the keys of entries in a tuning exception table at the network device (or elsewhere such as using a remote database access or web service) (STEP 322). While any type of search may be utilized to search the tuning exception table based on the tuning exception search key, in one embodiment a matching algorithm that allows for a partial or pattern match between the formed tuning exception search key and the keys of the tuning exception table may be utilized to search the tuning exception table.

If the search of the tuning exception table based on the tuning exception search key matches a key in the tuning exception table (Y branch of STEP 324), the tuning exception (e.g., values for one or more tuning parameters) corresponding to that matching key may be obtained and the values for the tuning parameters of that tuning exception corresponding to that matching key used to configure the detected transceiver module in the slot (STEP 326). If, however, there are no matching keys when a search of the tuning exception table is performed, default values for tuning parameters may be used to configure the detected transceiver module (STEP 328). These default tuning parameter values may be specified on the network device, or may be module default tuning parameter values as specified in the transceiver module itself.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature, or function, including any such embodiment, feature, or function described. While specific embodiments of, and examples for, the embodiments are described herein for illustrative purposes only. Various equivalent modifications are possible within the spirit and scope of the disclosure, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the disclosure will be employed without a corresponding use of other features, and features described with respect to one embodiment may be combined with features of other embodiments without departing from the scope and spirit of the disclosure as set forth.

APPENDIX

```
Schema
"propertie'" : {
  "tuningExceptionEntries" : {
    "type" : "array"
    "items" : {
      "type" : "object" ,
      "properties" : {
        "name": { },
        "matchingCriteria" : {
          "type" : "object" ,
          "properties" : {
            "manufacturer" : regexMatchingProperties,
            "model" : regexMatchingProperties,
            "serial" : regexMatchingProperties,
            "revision" : regexMatchingProperties,
            "slotType" : regexMatchingProperties,
            "hostModel" : regexMatchingProperties,
          },
          "additionalProperties" : False,
        },
        "tuningParameters" : {
          "type" : "object" ,
          "properties" : {
            "txInputEqualization" :
            tuningValueMatchingProperties,
            "rxOutputPreEmphasis" :
            tuningValueMatchingProperties,
            "txInputAdaptiveEqualizationEnable"
            :
            tuningValueMatchingProperties,
            "rxOutputPostEmphasis" :
```

APPENDIX-continued

```
            tuningValueMatchingProperties,
              "rxOutputAmplitude" :
            tuningValueMatchingProperties,
          },
          "additionalProperties" : False,
        }
      },
      "additionalProperties" : False,
      "required" : [ "matchingCriteria" , "tuningParameters" ],
      },
    },
  },
  "required" : [ "tuningExceptionEntries" ],
  "additionalProperties" : False,
}
Example Tuning Exception File
# This file specifies tuning values that do not follow typical tuning
# policy. The matchingCriteria fields is a prefix regex and the
tuningParameters
# fields are the tuning values to apply to any matched transceivers. Any
field not
# specified is ignored.

# The name field is optional.

# The tuningParameter fields can either be a numeric value or
"moduleDefault" version:
    major: 1
    minor: 0
tuningExceptionEntries:
    - name: tuningException1
    matchingCriteria:
        manufacturer: Arista
        model: 25GBASE-SFP-JR
        serial: 234234234
    tuningParameters:
        txInputEqualization: 0
        rxOutputPreEmphasis: 1
    - name: tuningException2
    matchingCriteria:
        manufacturer: Arista
        model: 25GBASE-SFP-JR
    tuningParameters:
        txInputEqualization: moduleDefault
        rxOutputPreEmphasis: 2
```

What is claimed is:

1. A network device, comprising:

a processor;

a memory, storing one or more tuning exception entries, the tuning exception entries comprising keys and corresponding tuning exceptions, wherein each key comprises values for one or more transceiver module attributes or network device attributes and each tuning exception specifies values for one or more tuning parameters;

a set of slots adapted to receive transceiver modules; and a non-transitory computer readable medium comprising instructions that, when executed by the processor, cause the processor to:

detect a first transceiver module in a first slot at the network device;

obtain a first transceiver module attribute value associated with the first transceiver module or a first network device attribute value associated with the network device;

form a first tuning exception search key from the first transceiver module attribute value or the first network device attribute value;

search the keys of the tuning exception entries based on the first tuning exception search key to determine if there is a first matching key;

when there is the first matching key, obtain the corresponding first tuning exception for the first matching key; and configure the first transceiver module in the first slot according to the values for the one or more tuning parameters of the corresponding first tuning exception.

2. The network device of claim 1, wherein the first network device attribute value is associated with the first slot of the network device.

3. The network device of claim 2, wherein the first network device attribute value is a slot type.

4. The network device of claim 2, wherein the instructions are further for:

detecting the first transceiver module in a second slot at the network device;

obtaining the first transceiver module attribute value associated with the first transceiver module or a second network device attribute value associated with the network device, wherein the second network device attribute is associated with the second slot;

forming a second tuning exception search key from the first transceiver module attribute value or the second network device attribute value;

searching the keys of the tuning exception entries based on the second tuning exception search key to determine if there is a second matching key;

when there is the second matching key, obtaining the corresponding second tuning exception for the second matching key; and configuring the first transceiver module in the second slot according to the values for the one or more tuning parameters of the corresponding second tuning exception.

5. The network device of claim 4, wherein the first tuning exception is the same as the second tuning exception.

6. The network device of claim 1, wherein the instructions further comprise instructions for, when there is no first matching key, configuring the first transceiver module in the first slot according to other values for the tuning parameters.

7. The network device of claim 6, wherein the other values for the tuning parameters comprise default tuning parameter values specified at the network device or module default parameter values obtained from the transceiver module.

8. The network device of claim 1, wherein the search is a regular expression match.

9. The network device of claim 1, wherein the first transceiver attribute module value comprises one of a vendor name, vendor part number, serial number or revision and the first network device attribute value comprises one of a system model, slot type or operating system version.

10. The network device of claim 1, wherein the one or more tuning exception entries are stored in a tuning exception table at the network device.

11. The network device of claim 10, wherein the instructions further comprise instructions for:

accessing a tuning exception file stored at the network device; and creating the tuning exception table at the network device based on the tuning exception file.

12. The network device of claim 11, wherein the tuning exception file is an alternative tuning exception file provided by a user.

13. The network device of claim 11, wherein the tuning exception file is provided in software of the network device.

14. A method, comprising:
- detecting a transceiver module in a slot at a network device;
- determining if there are tuning override values for one or more tuning parameters associated with the transceiver module or the slot;
- in response to determining there are tuning override values associated with the transceiver module or the slot, configuring the transceiver module in the slot according to the tuning override values for the one or more tuning parameters;
- in response to determining there are no tuning override values associated with the transceiver module or the slot:
  - obtaining a transceiver module attribute value associated with the transceiver module or a network device attribute value;
  - determining if there is a tuning exception associated with the transceiver module attribute value associated with the transceiver module or the network device attribute value;
  - when there is a tuning exception, configuring the transceiver module in the slot according to the values for one or more tuning parameters corresponding to the tuning exception; and
  - when there is no tuning exception, configuring the transceiver module in the slot according to default tuning parameters.

15. The method of claim 14, wherein the tuning override values are specified by a user using a tuning exception interface at the network device.

16. The method of claim 14, wherein the tuning exception is an alternative tuning exception.

17. The method of claim 14, wherein determining if there is the tuning exception comprises:
- forming a tuning exception search key from the transceiver module attribute value or the network device attribute value; and
- searching a set of tuning exceptions based on the tuning exception search key.

18. The method of claim 14, wherein the default tuning parameters are obtained from the transceiver module.

19. A method, comprising:
- generating one or more tuning exception entries at a network device from a tuning exception file, the tuning exception entries comprising keys and corresponding tuning exceptions, wherein each key comprises values for one or more transceiver module attributes or network device attributes and each tuning exception specifies values for one or more tuning parameters;
- detecting a first transceiver module in a first slot at the network device;
- determining if there are tuning override values for one or more tuning parameters associated with the first transceiver module or the first slot;
- in response to determining there are tuning override values associated with the first transceiver module or the first slot, configuring the first transceiver module in the first slot according to the tuning override values for the one or more tuning parameters;
- in response to determining there are no tuning override values associated with the first transceiver module or the first slot:
- obtaining a first transceiver module attribute value associated with the first transceiver module or a first network device attribute value associated with the network device;
- determining if there is a first tuning exception associated with the first transceiver module attribute value associated with the first transceiver module or the first network device attribute value by:
  - forming a first tuning exception search key from the first transceiver module attribute value or the first network device attribute value, and
  - searching the keys of the tuning exception entries based on the first tuning exception search key to determine if there is a first matching key;
- when there is the first tuning exception, obtaining the corresponding first tuning exception for the first matching key, and configuring the first transceiver module in the first slot according to the values for the one or more tuning parameters of the corresponding first tuning exception; and
- when there is not the first tuning exception, configuring the first transceiver module in the first slot according to default tuning parameters.

20. The method of claim 19, further comprising:
- detecting a second transceiver module in the first slot at the network device;
- obtaining a second transceiver module attribute value associated with the second transceiver module or the first network device attribute value associated with the network device, wherein the first network device attribute is associated with the first slot;
- forming a second tuning exception search key from the second transceiver module attribute value or the first network device attribute value;
- searching the keys of the tuning exception entries based on the second tuning exception search key to determine if there is a second matching key;
- when there is the second matching key, obtaining a corresponding second tuning exception for the second matching key and configuring the second transceiver module in the first slot according to the values for the one or more tuning parameters of the corresponding second tuning exception; and
- when there is not the second tuning exception, configuring the first transceiver module in the first slot according to default tuning parameters.

* * * * *